United States Patent [19]

Hatch

[11] 4,241,273
[45] Dec. 23, 1980

[54] COMPLIANT CAGE FOR RACEWAY-TYPE LIQUID METAL CURRENT COLLECTOR FOR HIGH-SPEED ACYCLIC MACHINES

[75] Inventor: Burton D. Hatch, Ballston Lake, N.Y.

[73] Assignee: General Electric Company, Schenectady, N.Y.

[21] Appl. No.: 23,809

[22] Filed: Mar. 26, 1979

[51] Int. Cl.³ .............................................. H02K 13/00
[52] U.S. Cl. .................................. 310/219; 339/5 L; 310/178
[58] Field of Search ...................... 310/219, 178, 232; 322/48; 339/5 L, 8 L

[56] References Cited

U.S. PATENT DOCUMENTS

| | | | |
|---|---|---|---|
| 3,163,792 | 12/1964 | Sayers | 339/5 L |
| 3,211,936 | 10/1965 | Harvey | 310/178 |
| 3,546,508 | 12/1970 | Harvey | 310/219 |
| 3,585,398 | 6/1971 | Harvey | 310/178 |
| 3,989,968 | 11/1976 | Hatch | 310/219 |
| 4,027,184 | 5/1977 | Hurley | 310/178 |
| 4,146,807 | 3/1979 | Hatch | 310/219 |

OTHER PUBLICATIONS

Superconducting Machinery for Naval Ship Propulsion, H. G. Stevens et al., 1/1977.

*Primary Examiner*—R. Skudy
*Attorney, Agent, or Firm*—Nathan D. Herkamp; James C. Davis, Jr.; Paul R. Webb, II

[57] ABSTRACT

An electrical current collector for an acyclic machine employs a stator collector ring which encircles a rotor collector ring and includes a plurality of fins protruding radially-inward from the stator collector ring into a plurality of compliant containment cages, respectively, each cage axially and circumferentially defining a raceway through which liquid metal flows in continuous contact with the rotor collector ring and the stator fin. The walls of the cages are made of resilient nonconductive material and when in a state of compression will exert a continuous bias toward the rotor collector ring.

12 Claims, 3 Drawing Figures

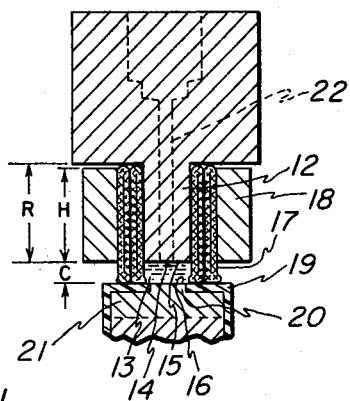
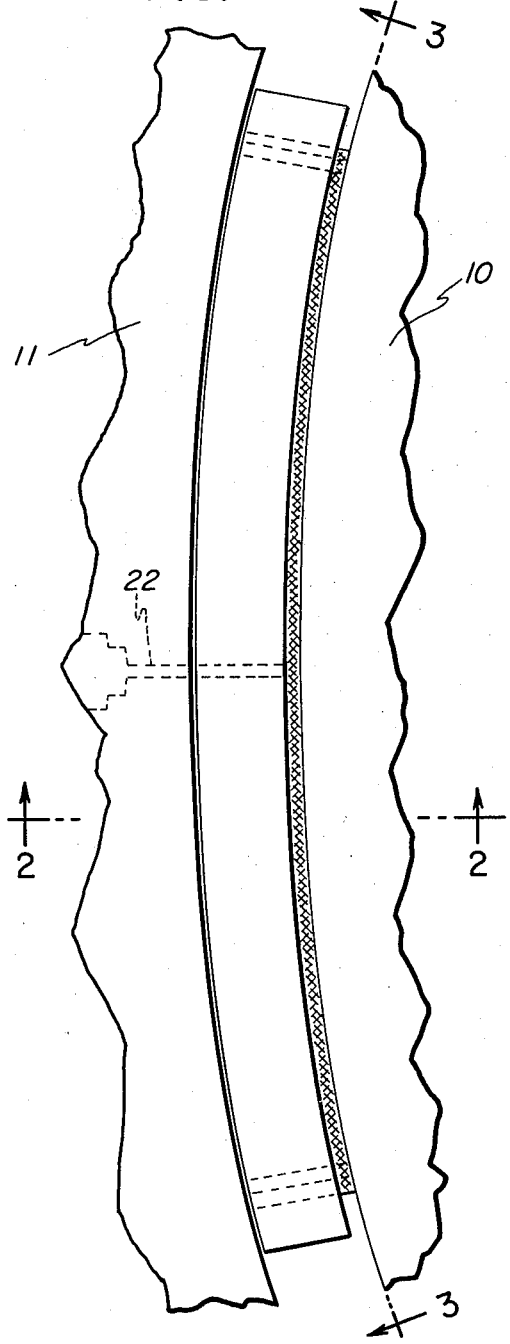
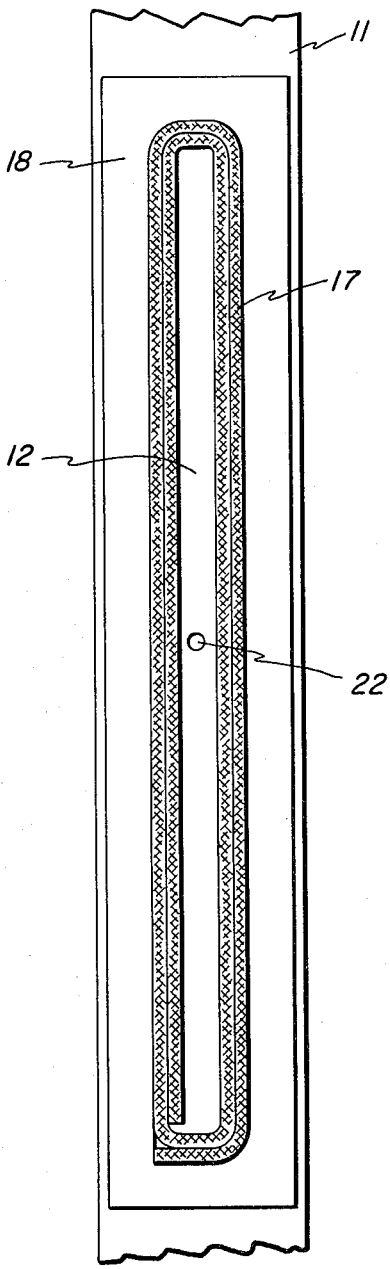

COMPLIANT CAGE FOR RACEWAY-TYPE LIQUID METAL CURRENT COLLECTOR FOR HIGH-SPEED ACYCLIC MACHINES

The invention herein described was made in the course of or under contract No. N00024-73-C-5488 with the U.S. Navy.

BACKGROUND OF THE INVENTION

This invention relates to acyclic machines employing liquid metal electrical current collectors, and more particularly to apparatus for maintaining liquid metal in contact with limited surface areas at all angular velocities including zero.

In an acyclic machine using, instead of solid brushes, liquid metal current collectors on a collector ring, the liquid metal forms a portion of the current carrying loop. Due to the relative rotation of the collector rings, positive containment of the liquid metal employed in the place of solid brushes, which define clearly identified contact areas, has required use of rigid containment walls machined to exceptionally close tolerances and biased toward the rotor collector ring.

In generator applications as shown, for example in L. M. Harvey U.S. Pat. Nos. 3,211,936, and 3,546,508 issued Oct. 12, 1965 and Dec. 8, 1970, respectively, both of which are assigned to the instant assignee, centrifugal force generated within the liquid as it is caused to rotate by the relatively rotating collector rings has been successfully used to retain liquid metal in the collector site at speeds above a minimum rotor angular velocity. In these prior generators, if rotor angular velocity were to fall below a minimum value, or completely stop, the liquid metal would drain from its location in the collector gap. Therefore, the generator would normally not be operated at less than about 25% of its rated speed, nor at any speed in a reverse direction.

In motor applications, such as ship propulsion, capability of applying full torque (and overload torques) at any and all motor speeds (e.g., up to 1500 RPM) in both directions of rotation, including zero speed and emergency reversals, is essential. At zero and low rotor angular velocities, centrifugal force is either completely unavailable or insufficient to retain the liquid metal in the collector site. However, if the liquid metal is not retained in the collector site, either the electric circuit will be broken or electrical arc-over will occur. In either case, the motor will be rendered inoperative. To overcome these problems, the method and apparatus described and claimed in B. D. Hatch U.S. Pat. No. 3,989,968, issued Nov. 2, 1976 and J. D. Hurley U.S. Pat. No. 4,027,184, issued May 31, 1977, both of which patents are assigned to the instant assignee, have been devised. The invention in each of these patents is intended to prevent or counteract Lorentz expulsion forces on liquid metal in the current collectors of acyclic machines. In each of these patents, the contact between rotor and stator collector rings involves passage of electrical current through an intermediate metallic portion. Consequently, current passing between rotor and stator collector rings must flow through two, circumferentially-separated volumes of liquid metal and four liquid metal-to-solid metal interfaces. As a result, collector electrical resistance, and therefore loss, is larger than it would be if only a single volume of liquid metal were interposed between the rotor and stator collector rings. In addition, the large amount of total wetted area results in viscous losses which could be reduced by reducing the total wetted area.

Patent application Ser. No. 934,100, filed Aug. 16, 1978 by R. A. Marshall and assigned to the instant assignee provides a single layer liquid metal contact between relatively-moving rotor and stator collector rings. This application involves use of rigid walled enclosures biased toward the rotor collector ring to contain a volume of liquid metal in contact with each of the collector rings. In application Ser. No. 838,714, filed Oct. 3, 1977, now U.S. Pat. No. 4,146,807, issued Mar. 27, 1979, by the instant inventor and assigned to the instant assignee and incorporated herein by reference, a plurality of circumferentially-abutting enclosures are located around the circumference of the collector rings to form a plurality of confined contact areas for the liquid metal current collectors. By frictionally-engaging the ends of the adjacent enclosures, a flexible arch arrangement is provided which allows for slight eccentricity of the relatively-rotating collector rings. Use of rigidly-formed containment enclosures requires that the parts be machined to close tolerances and biased toward the rotor collector ring by springs or other devices located between the fixed collector ring and the containment wall. This adds a requirement for highly skilled machinists to manufacture the containment walls, and adds assembly steps in mounting the containment walls on springs within the machine, and requires that some device be used to hold the containment wall securely until the rotor is positioned within the machine.

Accordingly, one object of the instant invention is to provide a liquid metal current collector which allows continuous electrical contact between predetermined areas of an acyclic machine stator collector ring and rotor collector ring thereof.

Another object is to provide a liquid metal electrical current collector between the rotor and stator collector rings in an acyclic machine having a construction such that the containment wall is permanently affixed to one of the current collector rings, while providing a resilient containment wall to accommodate variations in the surface of the other collector ring.

SUMMARY OF THE INVENTION

Briefly, in accordance with a preferred embodiment of the invention, an electrical current collector for an acyclic machine comprises a rotor collector ring, a stator collector ring encircling the rotor collector ring and a plurality of compliant nonconductive cages affixed to the stator collector ring. Each of the enclosures surrounds a stator fin, respectively, protruding radially-inward from the stator collector ring and terminating at a location closely adjacent the radially-outer surface of the rotor collector ring. A compliant raceway is thereby formed in the space defined axially and circumferentially by the cage sectors and radially by the radially innermost surfaces of the fins and the radially outermost surface of the rotor collector ring. Liquid metal is situated in the raceway in contact with the radially-innermost surfaces of the stator fins and the radially-outermost surface of the rotor collector ring.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a side view of a current collector of the instant invention;

FIG. 2 is a cross sectional view taken along line 2—2 of FIG. 1; and

FIG. 3 is a view of the open side of the current collector taken along line 3—3 of FIG. 1.

MANNER AND PROCESS OF MAKING AND USING THE INVENTION

The specific features of the instant invention described herein and shown in FIGS. 1-3 are merely exemplary, and the scope of the invention is defined in the appended claims. Throughout the description and FIGS. 1-3 like reference characters refer to like elements of the invention.

The figures illustrate a portion of a rotor collector ring 10 and a portion of a cooperating stator collector ring 11 in electrical contact therewith through stator fin 12 protruding radially-inward from the stator collector ring 11 and extending around part of its circumference. A volume of liquid metal 13, conventionally a sodium-potassium alloy (NaK), fills the space 14 between the radially-innermost surface 15 of fin 12 and the radially-outermost surface 16 of rotor collector ring 10.

The liquid metal 13 is generally retained axially and circumferentially in region 14 by a compliant wall 17 surrounding stator fin 12. The compliant wall 17 is held in place by clamp ring 18 which is slid radially into place over the stator fin 12 and compliant wall 17 to frictionally hold the compliant wall to the stator fin 12 thereby forming a racetrack-shaped enclosure around the stator fin 12.

Rotor collector ring 10 is coated with an insulating layer 19 that is open in the area 20 adjacent region 14 in order to permit liquid metal 13 situated therein to make contact with the rotor collector ring 10 at a continuous conductive band in axial alignment with region 14 only. Coating 19 may typically comprise alumina, and is applied so as to ensure that electrical conduction between rotor collector ring 10 and each of stator fins 12 occurs directly through a liquid metal path in region 14. Although rotor collector ring 10 is typically fabricated of iron, peripheral tip region 21 of the rotor is preferably formed of copper in order to provide adequate electrical conductivity at the outermost periphery of the rotor collector ring.

The compliant cage means includes walls 17 made of nonconductive material (e.g., glass or alumina fibers) and clamp ring 18. The nonconductive wall material could also be fine wires made of a conductive material, such as copper having the necessary mechanical properties, coated with a highly resistive or insulating material, so that essentially no electrical current is carried by the compliant cage. The nonconductive material is formed into a suitable braid and flattened into a strip, which is wrapped a suitable number of times (e.g., two or more times is preferred) about stator fin 12. In wrapping braid 17 around stator fin 12 the braid is curved in the direction perpendicular to a radius of the stator collector ring 11 so as to conform to the curved surface of rotor collector ring 10 and stator collector ring 11, as shown in FIG. 1. Clamp ring 18 is pushed down over nonconductive wall 17 and secures the wall frictionally to fin 12. The clamp ring 18 is preferably made of stainless steel having a high electrical resistance, so as not to provide any current path therethrough between the rotor and stator collector rings. Other materials having appropriate mechanical strength and electrical properties could be used for the clamping ring 18.

As shown in FIG. 2, stator collector ring 11 and rotor collector ring 10 are separated by a radial distance, R. Stator fin 12 has a radial height, H, selected to provide an adequate radial clearance, C, between the stator fin and the rotor collector surface. The radial clearance, C, is determined by the radius of the rotor disk 10 (a typical radius is 3-3/16 inches), the radius of the interior surface of the stator collector ring 11 (typically 3.615 inches) and the height H of stator fin (typically 0.3875 inch) leaving a clearance, C, of approximately 0.040 inch. Other radii of the rotor disk and stator collector ring can be used as desired, and the height of the stator fins selected to maintain an appropriate clearance, C, and the example is given for illustration only. The initial radial width of the nonconductive braid is selected to be greater than the separation between the rotor collector ring 10 and the stator collector ring 11 by a suitable amount (e.g., 0.010 to 0.020 inch) so as to cause the braid surface in contact with the surface 16 of rotor collector ring 10 to press inward on the rotor surface deforming the wall material slightly as shown in FIG. 2. This will cause a slight "wear in" so that the braid assumes the exact position of the rotor collector ring after assembly. Thereby, large (e.g., 0.010 inch) radial tolerances are permitted in the original positioning of the compliant cage material, and in the finishing portion of manufacturing the rotor collector ring and the stator fins.

The radial clearance, C, inside the cage is filled with a volume of liquid metal 13 (e.g., NaK) at a suitable pressure so that the entire surface area 15 of fin 12 is covered with liquid metal making contact between rotor collector ring 10 and stator fin 12. A supply passage 22 is provided so as to continuously resupply liquid metal to the space 14 to replace any liquid metal lost through the insulating braid 17 or drawn out by rotation of the rotor collector ring. The liquid metal which escapes from the raceway collectors is collected by a sump (not shown) and returned to the liquid metal supply (not shown). Thereby, the volume of liquid metal in space 14 is always sufficient to maintain contact over the entire contact surface 15 of each fin 12.

For motor applications, in which operation in both directions of rotation is required, the liquid metal supply passages 22 would be located at the circumferential center of the stator fins, as shown in FIGS. 1 and 3. In generator applications, in which a single direction of rotation is required, tests to date indicate that the optimum location of the supply passages is near the leading ends of the stator fins, respectively, relative to the direction of rotor rotation, as described in my aforementioned U.S. Pat. No. 4,146,807. In this configuration viscous drag between the liquid metal and the rotor collector ring surface helps spread the liquid metal over the entire contact area.

Although not indicated in the drawings, the machine may conveniently be fabricated with split stator rings to facilitate assembly. This enables the top half of the stator ring to be lowered onto the rotor ring at assembly, or to be lifted off the rotor ring at disassembly. When the machine is assembled, the compliant cages will be deformed slightly by the positioning of the rotor and stator adjacent each other to complete the construction of the confinement cages.

Those skilled in the art will appreciate that the compliant cages situated around stator collector ring 12 provide a resilient wall 17 to confine liquid metal to a defined area. Thereby, use of machine tolerances within the capability of normal manufacturing procedures is possible. Also, a single layer of liquid metal connects the rotor collector with the stator collector, thereby limiting ohmic resistance losses of the liquid metal collector to the minimum that can adequately allow for the necessary mechanical running clearances between the stator fins 12 and the rotor collector ring 10. Further, minimization of liquid metal to solid metal interface areas also minimizes viscous frictional losses in the machine.

BEST MODE

In the best mode of my invention I contemplate utilizing a plurality of axially spaced copper stator collector rings. Each stator collector ring has a plurality of circumferentially spaced copper stator fins in juxtaposition with a rotor collector ring having an exposed circumferential copper band at the radially-outer edge thereof. Each cage means has a nonconductive compliant wall made of a mat of woven alumina fiber cloth ½ inch wide by 1/16 inch thick, which is wrapped around a stator fin twice and frictionally clamped by a high electrical resistance stainless steel clamp ring. The clearance between the stator fin and rotor collector ring is approximately 0.020 inch. The stator fin is between 0.200 and 0.210 inch thick in the axial direction, and approximately 0.388 inch in radial height from the stator ring.

The foregoing describes a liquid metal current collector which allows continuous electrical contact between predetermined areas of an acyclic machine stator and rotor collector rings. The liquid metal current collector exhibits reduced viscous drag losses at high operating speeds, while providing current carrying capacity at all operating speeds including zero and reverse operation, by precluding complete loss of liquid metal between the stator and rotor collector rings under these conditions. The collector further provides a single liquid metal electrical current transfer between rotor and stator collector rings. The compliant cage containment provides wider tolerance allowances for fabrication of the rotor and stator collector rings than rigid collector containment devices and allows for comparatively large radial tolerances in the positioning of the cage material during assembly of the machine.

I claim:

1. In an electrical current collector for an acyclic machine, comprising:
   a rotor collector ring;
   a stator collector ring encircling said rotor collector ring and including a plurality of circumferentially-extending stator fins protruding radially-inward from said stator collector ring and terminating at a location closely adjacent and spaced from the radially-outer surface of said rotor collector ring;
   the improvement comprising:
   a plurality of compliant cage means, one of said cage means surrounding each stator fin, respectively, and forming a compliant raceway surrounding a space defined axially by said cage means and defined circumferentially by the radially-innermost surface of said stator fin together with the radially-outermost surface of said rotor collector ring;
   said cage means having walls of resilient nonconductive filamentary material extending toward the radially-outermost surface of said rotor collector ring; said walls being deformed by contact with said radially-outermost surface of said rotor collector ring; and
   a volume of liquid metal situated in each said space, said volume of liquid metal being sufficient to make physical contact with the radially-innermost surface of each of said stator fins, respectively, and the radially-outermost surface of said rotor collector ring.

2. The apparatus of claim 1 wherein said compliant cage means comprises a woven fiber cloth surrounding said stator fin and a clamp ring for frictionally securing said cloth to said stator fin.

3. The apparatus of claim 2 wherein said clamp ring comprises a ring of stainless steel having high electrical resistance.

4. The apparatus of claim 3 wherein said rotor collector ring is coated with electrical insulation over its entire outermost surface except for a circumferential contact area situated in alignment with said stator fin in said space defined axially by said cage means.

5. The apparatus of claim 4 wherein said cloth has a radial width when undeformed in excess of the radial distance separating said rotor collector ring from said stator collector ring, and the radially-inner edge of said cloth is compressed by said rotor collector ring when the machine is assembled.

6. The apparatus of claim 5 including a port extending radially through each of said stator fins, respectively, and through said stator collector ring, for admitting liquid metal into said raceway.

7. The apparatus of claim 6 further comprising liquid metal supply means in flow communication with each said port for supplying liquid metal under pressure to each said space.

8. The apparatus of claim 7 wherein said cloth comprises woven alumina fibers.

9. The apparatus of claim 7 wherein said cloth comprises woven glass fiber.

10. The method of conducting electrical current between a stator collector ring and a relatively-rotating rotor collector ring, comprising:
    defining a plurality of nonconductive compliant filamentary arcuate raceways of limited axial extent deformed by contact with said rotor collector ring and disposed in a series about said rotor collector ring and extending radially inward of the radially-innermost surfaces of a plurality of circumferentially-spaced stator fins; each of said fins protruding radially-inward from said stator collector ring and being surrounded, respectively, by one of said raceways; and
    supplying a sufficient volume of liquid metal to each said raceway to provide a continuous contact of liquid metal between each of said fins, respectively, and said rotor collector ring.

11. The method of claim 10 wherein said step of defining a plurality of nonconductive compliant arcuate raceways comprises surrounding each said stator fin, respectively, with a plurality of layers of glass fiber cloth and clamping said cloth to each stator fin, respectively, and deforming said cloth by contact with said rotor collector ring.

12. The method of claim 10 wherein said step of defining a plurality of nonconductive compliant raceways comprises surrounding each said stator fin, respectively, with a plurality of layers of alumina fiber cloth and clamping said cloth to each stator fin, respectively, and deforming said cloth by contact with said rotor collector ring.

* * * * *